Dec. 31, 1929.  J. M. BARTON  1,741,675
KETTLE
Filed May 4, 1927

Inventor:
Joseph M. Barton,
by Arthur Rundall
Atty.

Patented Dec. 31, 1929

1,741,675

UNITED STATES PATENT OFFICE

JOSEPH M. BARTON, OF ATHOL, MASSACHUSETTS

KETTLE

Application filed May 4, 1927. Serial No. 188,671.

This invention relates to boilers and particularly to portable kettles designed for household or culinary purposes and in which water or other liquid is heated or boiled.

The object of the invention is to provide an improved portable boiler or kettle, and particularly to provide an efficient vessel of the class referred to so organized and constructed that it can be used in connection with the burner or heating unit of a stove without interfering with the simultaneous free use, of said burner or unit for other purposes, such as frying, toasting, etc., or even for operating another boiler or kettle.

To these ends I have provided an improved kettle having the peculiar features of construction and mode of operation and use set forth in the following description, the novel features of the invention being particularly pointed out and clearly defined in the claims at the close of the description.

In the accompanying drawings:—

Figures 1, 2:
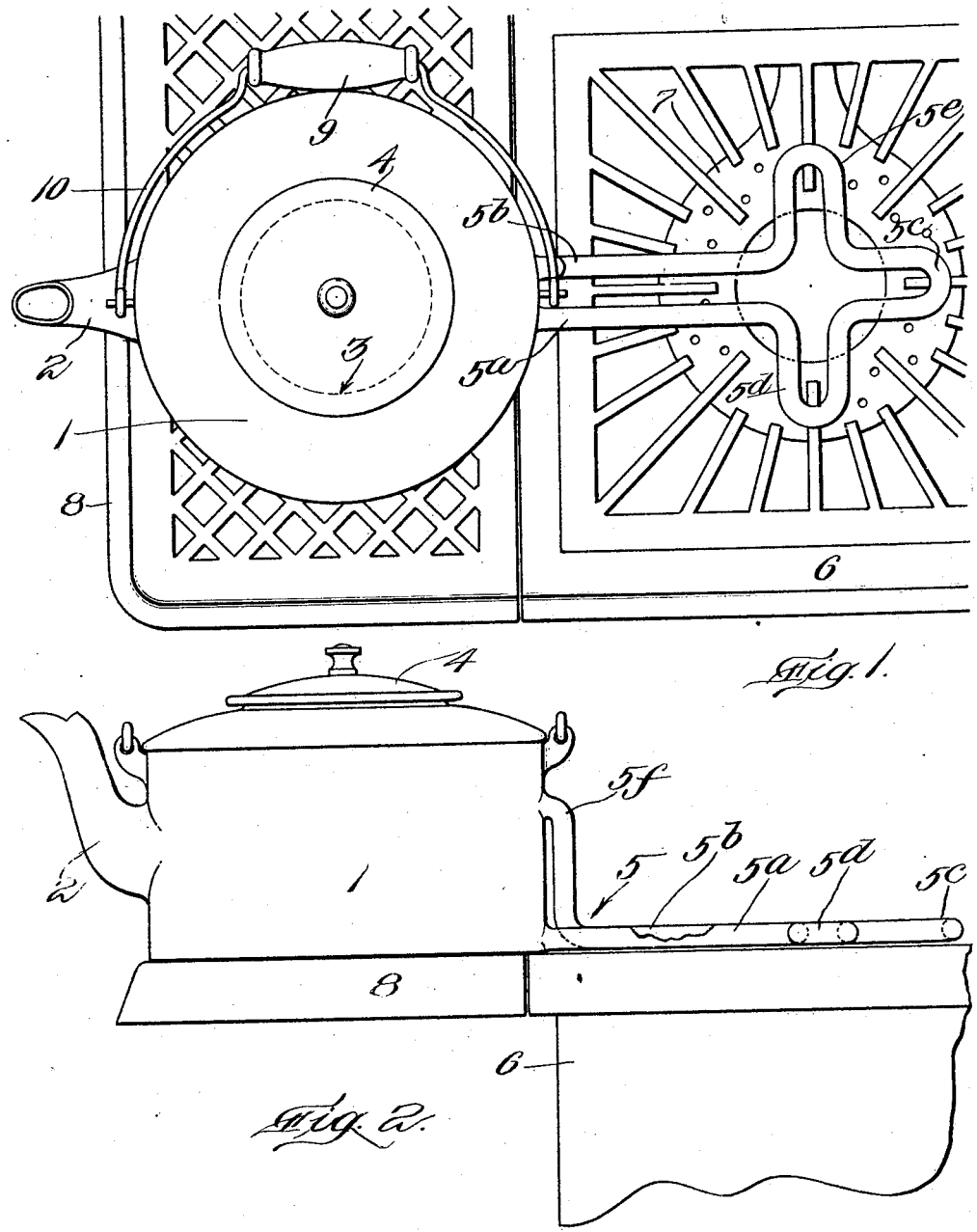
Figure 1 is a plan view of a kettle designed for culinary purposes and constructed in accordance with my invention, the same being shown in operative position upon the top of a gas stove of ordinary construction.
Figure 2 is a side elevation of the parts shown in Fig. 1.

Herein I have illustrated my invention as embodied in a teakettle comprising a sheet metal vessel or liquid container 1 provided with a delivery spout 2 and having at its top the usual opening or filling hole 3 that is normally closed by the usual removable cover 4.

To the vessel 1 are connected in any suitable manner, as by brazing, welding or the like, the opposite ends of a length of metal pipe 5 which is bent upon itself near its middle as at $5^c$ to provide two parallel legs $5^a$ and $5^b$ preferably disposed side by side in a horizontal plane just above the plane of the bottom of the vessel 1 and approximately radially with respect to the center of the more or less cylindrical vessel 1. Near the bend $5^c$ each leg $5^a$ and $5^b$ is preferably bent to provide a laterally extending loop $5^d$ and $5^e$, respectively, and when the kettle is for use upon the ordinary gas stove the distance of these loops from vessel 1 will be about seven inches and the distance of said loops from the bend $5^c$ will be about the same as the length of one of said loops, say about three and one quarter inches. Thus there is provided, near the middle of the pipe 5, three horizontally disposed loops radiating from a common center from which the two legs $5^a$ and $5^b$ also radiate, and the distance of this common center from the center of the vessel 1 is preferably made approximately the same as the distance from center to center of two adjacent burners or heating units of the stove. When the kettle is placed on a gas stove 6 with the group of loops $5^c$, $5^d$ and $5^e$ over one of the burners 7, said loops, together with the adjacent portions of the two legs $5^a$ and $5^b$, provide a seat for a pan, kettle or other vessel, or utensil which will be heated by the burner or unit 7 at the same time that the latter is serving to heat the pipe 5.

The leg $5^a$ of the pipe is connected with the lower part of the vessel 1 while the leg $5^b$ is made with an upwardly extending end portion $5^f$ that is connected with the upper part of vessel 1.

When the kettle is to be used, it is filled with water or other liquid up to a level that is above the point at which the leg $5^b$ communicates with the interior thereof, and it will be clear that when the pipe 5 is heated by the burner the liquid within the pipe will be heated and a circulation of the same will be created and maintained from the lower part of vessel 1, through pipe 5 to the upper part of the vessel. Thus, while the burner 7 is being utilized for other service the liquid within the vessel 1 is simultaneously heated.

When the stove 6 is being used only to heat the liquid within kettle 1, or when it is desired to heat said liquid in the shortest time possible, the kettle may be placed on the stove with its vessel 1 over one burner and its group of loops $5^c$, $5^d$ and $5^e$ over another burner. Or, when it is desired to use the stove, or burner, for other purposes and at the same time heat the liquid within the vessel 1, then the latter may be placed on the shelf 8 of the stove with the loops of its pipe 5 positioned over the burner, or one of the burners, of the stove as shown in the drawings.

The vessel 1 may be provided with the usual handle 9 whose bail 10, when in upright position for use, is in the same vertical plane not only with the spout 2 but with the center line of the cross-shaped figure of the pipe 5 as viewed in plan. In this way the center of gravity of the structure as a whole is in the same vertical plane with the handle when it occupies the position referred to. Therefore, the kettle above described may be controlled and manipulated by means of its handle as conveniently, and in the same manner, as the ordinary kettle heretofore provided.

From the above description it will be seen that my invention in its best form, and as herein shown, is embodied in a teakettle for household or culinary use and, like the ordinary tea kettle heretofore provided, is provided with a handle by means of which it can be moved about and manipulated with the same ease and convenience as is the case of the old form of teakettle. Copper tubing serves best for the pipe 5 and since said pipe is comparatively thin and of comparatively short length it does not add materially to the weight of the article. Furthermore, the addition of the pipe 5 to the vessel 1 does not add materially to the cost of the structure as a whole.

What I claim is:

1. A tea kettle comprising a vessel having a spout at one side thereof; a bail-shaped handle having its ends pivotally connected with the upper end of said vessel at opposite sides thereof in the same plane with said spout and so as to swing side wise, and a length of metal pipe bent upon itself near its middle to provide two parallel legs disposed side by side in a horizontal plane immediately above the plane of the bottom of the vessel and wholly at one side thereof so as to serve as an extension thereof and to provide at the outer end of said extension horizontally radiating loops to serve as a seat for another vessel, the end of one of said legs being welded to the vessel immediately adjacent the bottom thereof and the other leg being bent upwardly adjacent said vessel and having its upper end welded to said vessel at a higher point, and said pipe extension projecting radially outward from said vessel diametrically opposite the spout of the latter and in the same vertical plane with said spout and the pivots of said handle.

2. A teakettle comprising a vessel; a spout for said vessel; a bail-shaped handle having its ends pivotally connected at the top of said vessel at opposite sides thereof and in the same vertical plane with said spout, and a length of metal pipe bent upon itself near its middle to provide two legs disposed in a horizontal plane immediately above the plane of the bottom of the vessel and wholly at one side of the latter so as to serve as an extension thereof, one of said legs being connected with the vessel near the bottom thereof and the other leg being connected with said vessel at a higher point, and said pipe extending outwardly from said vessel diametrically opposite said spout and bent to provide a seat for another vessel or the like.

3. A teakettle comprising a vessel provided at one side thereof with a radially projecting spout; a bail-shaped handle having its ends pivotally connected with the upper portion of said vessel at opposite sides thereof, said pivotal connections and said spout being disposed in one and the same vertical plane coincident with the middle of said vessel, and an external heating tube having its ends connected, respectively, with the upper and lower portions of said vessel and communicating with the interior thereof, the intermediate portion of said tube extending radially away from said vessel opposite said spout and being bent laterally to provide a seat for another vessel the under side of which is in the same horizontal plane with the bottom of said vessel, and with said seat symmetrically disposed with respect to said vertical plane so that said vessel is balanced in an upright position when supported by said handle.

Signed by me at Boston, county of Suffolk and State of Massachusetts, this 26th day of April, 1927.

JOSEPH M. BARTON.